United States Patent
Entringer et al.

(10) Patent No.: US 9,671,253 B2
(45) Date of Patent: Jun. 6, 2017

(54) ELECTRONIC MEASUREMENT CIRCUIT

(71) Applicant: EM MICROELECTRONIC-MARIN SA, Marin (CH)

(72) Inventors: Christophe Entringer, Corcelles-pres-Concise (CH); Sylvain Grosjean, Les Fins (FR)

(73) Assignee: EM MICROELECTRONIC MARIN S.A., Marin (CH)

( * ) Notice: Subject to any disclaimer, the term of this patent is extended or adjusted under 35 U.S.C. 154(b) by 45 days.

(21) Appl. No.: 14/732,257

(22) Filed: Jun. 5, 2015

(65) Prior Publication Data
US 2016/0011014 A1 Jan. 14, 2016

(30) Foreign Application Priority Data

Jul. 11, 2014 (EP) .................................... 14176763

(51) Int. Cl.
*G01D 5/241* (2006.01)
*G01P 15/125* (2006.01)
*G01L 1/14* (2006.01)

(52) U.S. Cl.
CPC .......... *G01D 5/2417* (2013.01); *G01P 15/125* (2013.01); *G01L 1/142* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,220,286 A | * | 6/1993 | Nadeem | G06G 7/1865 330/51 |
| 5,343,766 A | * | 9/1994 | Lee | G01D 5/2417 73/514.18 |
| 6,278,750 B1 | * | 8/2001 | Yu | H03M 3/484 341/143 |

(Continued)

OTHER PUBLICATIONS

European Search Report for EP 14176763 dated Dec. 11, 2014.

*Primary Examiner* — Clayton E Laballe
*Assistant Examiner* — Jas Sanghera
(74) *Attorney, Agent, or Firm* — Sughrue Mion, PLLC

(57) ABSTRACT

The present invention concerns an electronic measurement circuit for measuring a physical parameter. The circuit comprises: a measurement sensor comprising two differential mounted capacitors each comprising a fixed electrode, and a common electrode, common to the two capacitors which is arranged to be movable relative to each fixed electrode of the two capacitors in order to alter the capacitive value of each capacitor when the physical parameter is measured. The circuit further comprises a first integrator unit connected to the common electrode for integrating charge received from the measurement sensor, and comprising two integrators arranged to be connected alternately to the common electrode; a second integrator unit connected to the first integrator unit for integrating charge received from the first integrator unit; a comparator for comparing analogue output values from the second integrator unit; a switch circuit connected to the measurement sensor for switching different voltage values across the two capacitors; and a feedback circuit for feeding a digital output signal of the comparator to the switch circuit for controlling the operation of the switch circuit.

14 Claims, 4 Drawing Sheets

(56) References Cited

U.S. PATENT DOCUMENTS

| | | |
|---|---|---|
| 8,429,981 B2 | 4/2013 | Grosjean et al. |
| 2007/0236373 A1 | 10/2007 | Hellwig et al. |
| 2007/0247171 A1 | 10/2007 | O'Dowd et al. |
| 2010/0231237 A1 | 9/2010 | Deschildre et al. |
| 2011/0154906 A1 | 6/2011 | Grosjean et al. |
| 2013/0021182 A1* | 1/2013 | Mishra .................. H03M 3/496 341/143 |

* cited by examiner

ELECTRONIC MEASUREMENT CIRCUIT

This application claims priority from European patent application No. 14176763.2 filed Jul. 11, 2014, the entire disclosure of which is hereby incorporated herein by reference.

TECHNICAL FIELD

The invention relates to the field of measurement circuits for measuring a physical parameter. More specifically, the present invention relates to measurement circuits comprising a capacitive sensor. The invention also relates to a corresponding method of measuring a physical parameter, and to a computer program product.

BACKGROUND OF THE INVENTION

Capacitive sensors used for measuring a physical parameter may comprise a mobile common electrode that forms part of an armature resiliently held between two fixed electrodes. This common electrode is capable of moving a certain distance in the direction of one or the other of the fixed electrodes as a result of an applied force, for example. In the inoperative state, the common electrode is at an approximately equal distance from the two fixed electrodes, which defines equal capacitive values for the two capacitors. When the common electrode moves, for example as the result of an applied force, the capacitive value of each capacitor varies inversely to the capacitive value of the other. The electronic interface circuit of a capacitive sensor is thus arranged to provide an output signal in the form of a voltage dependent on the variation in the capacitances of the two capacitors. This kind of capacitive sensor can be used for instance to measure acceleration values.

An electrical interface circuit is connected to the measurement sensor to process the signal from the measurement sensor. Conventional interface circuits, such as the one described in the patent U.S. Pat. No. 8,429,981 B2, use a digital-to-analogue converter (DAC) in order to provide voltage as input for pre-charging the capacitances of the capacitive measurement sensors. The resolution of this DAC is directly linked to the resolution of the digital output of the measurement circuit. For instance a 10-bit resolution output needs a 10-bit resolution DAC in a feedback circuit of the interface circuit. The conventional techniques may be very efficient for a low resolution output (e.g. up to a 10-bit resolution). However, some linearity problems inherent to the precision of the DAC appear beyond this resolution. Furthermore, in the existing solutions, a repetitive pre-charge phase is needed for pre-charging the measurement sensor capacitances. However, the disadvantage of this precharge phase is that no measurement signal is generated during this phase, while some energy is used to charge the capacitors.

The patent application US 2007/0247171 A1 describes an electronic interface circuit of one or two capacitors with variable capacitance. Said interface circuit includes a differential integrating amplifier with two inputs, a switching circuit for charging each capacitor by different voltages in a first phase, and to connect a fixed electrode of each capacitor to one respective input in a second phase. Each capacitor is biased by reverse different voltages in a third phase, and their fixed electrode is connected to a respective input of the amplifier in a fourth phase. A common electrode of the capacitors is connected to earth. The two output signals from the amplifier are compared in a comparator to control a switched capacitor circuit. The operation of said electronic interface circuit is relatively long to obtain a measured value at output, and the excitation of the capacitors is performed in a symmetrical manner, which are drawbacks.

The patent application US 2010/0231237 A1 describes an electronic circuit with a capacitive sensor for measuring a physical parameter. The sensor includes two capacitors mounted in differential, whose a common electrode is connected to one input of a charge transfer amplifier. An integrator is connected to the output of the charge transfer amplifier and is controlled by a dynamic comparator. The measured output of the integrator can be applied to the fixed electrodes of the capacitors through an excitation unit in a first phase of operation. In a second phase, the fixed electrodes of the capacitors are biased by two different voltages through the excitation unit. It is necessary to have several measuring cycles to obtain a final measured value at output of the electronic circuit, which is a drawback.

In the patent application US 2007/0236373 A1, it is only described a circuit for converting the capacitive signal change of a differential capacitor into digital signals. Different capacitors can be connected to an input of an integration amplifier followed by a comparator.

SUMMARY OF THE INVENTION

It is an object of the present invention to overcome the problems identified above related to the operation or structure of measurement circuits which use capacitive sensors as measurement sensors. According to a first aspect of the invention, there is provided an electronic measurement circuit for measuring a physical parameter, the circuit comprising:

- a measurement sensor comprising two differential mounted capacitors each comprising a fixed electrode, and a common electrode, common to the two capacitors which is arranged to be movable relative to each fixed electrode of the two capacitors in order to alter the capacitive value of each capacitor when the physical parameter is measured;
- a first integrator unit connected to the common electrode for integrating charge received from the measurement sensor, and comprising two integrators arranged to be connected alternately to the common electrode via two switches;
- at least one intermediate integrator unit connected to integrate charge received from the first integrator unit, the or each intermediate integrator unit comprising two integrators arranged to integrate charge alternately from the two integrators of the first integrator unit;
- a comparator for comparing analogue output values from the two integrators of the or a last one of the at least one intermediate integrator unit;
- a switch circuit connected to the measurement sensor for switching different voltage values across the two capacitors; and
- a feedback circuit for feeding a digital output signal of the comparator to the switch circuit for controlling the operation of the switch circuit.

The proposed new solution has the advantage that a high resolution output signal is obtained after decimation as explained later. The proposed solution also offers high linearity thanks to the applied symmetrical structure. It is also possible to connect the central electrode to virtual ground during normal operation of the measurement circuit. Thanks to this virtual ground in the central node (common electrode of both capacitors), the signal does not depend on the parasitic capacitance any more, i.e. the signal is not adversely affected by the central parasitic capacitance.

Moreover, all the voltage transitions across the sensor capacitors during a given value of the feedback signal from the comparator are used to generate the effective measurement output signal/improve resolution. According to a second aspect of the invention, there is provided a method of measuring a physical parameter by an electronic measurement circuit comprising a measurement sensor comprising two differential mounted capacitors, each comprising a fixed electrode, and a common electrode, common to both of the capacitors, which is arranged to be movable relative to each fixed electrode of the two capacitors in order to alter the capacitive value of each capacitor when the physical parameter is measured, the method comprising:

a first integrator unit connected to the common electrode integrating charge received from the measurement sensor, wherein the first integrator unit comprises two integrators connected alternately to the common electrode and performing the integration of the charge alternately via two switches;

at least one intermediate integrator unit connected integrating charge received from the first integrator unit, the or each intermediate integrator unit comprising two integrators performing the integration of the charge alternately from the two integrators of the first integrator unit;

a comparator comparing analogue output values from the two integrators of the or a last one of the at least one intermediate integrator unit;

a feedback circuit feeding a digital output signal of the comparator to a switch circuit connected to the measurement sensor; and the switch circuit varying the voltage across the two capacitors as a function of the received digital output signal.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF EMBODIMENTS OF THE INVENTION

Figure 1:
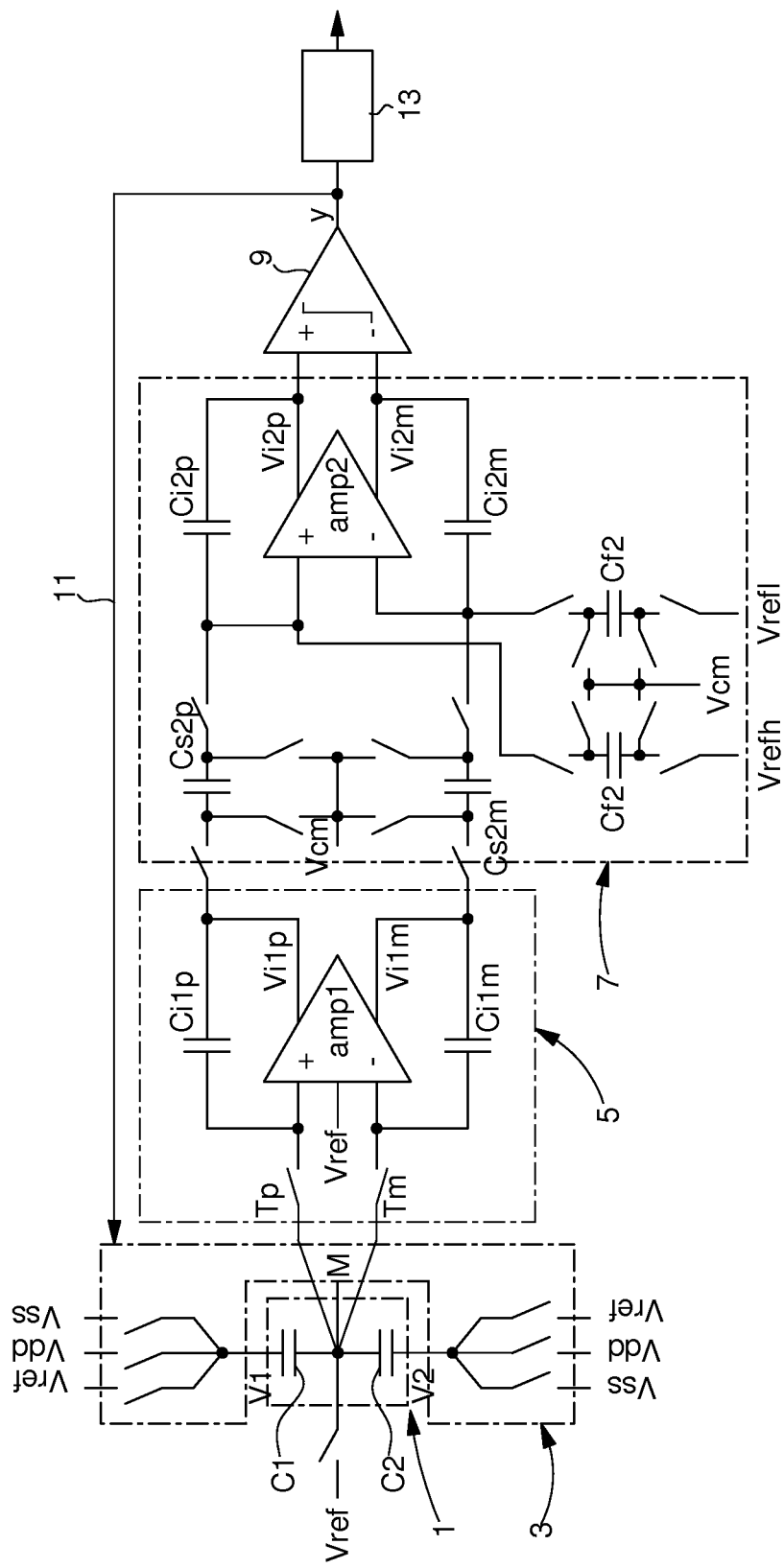
FIG. 1 is a block diagram showing a second order electronic measurement circuit according to one aspect of the present invention.

An embodiment of the present invention will now be described in detail with reference to the attached figures. Identical or corresponding functional and structural elements which appear in the different drawings are assigned the same reference numerals.

The measurement circuit or system shown in FIG. 1 is composed of a measurement sensor 1 comprising the capacitors C1 and C2, a switch circuit 3, a first integrator circuit or unit 5, a second integrator circuit or unit 7 (intermediate integrator unit), a comparator 9 and a feedback circuit 11. There is further shown a decimation unit 13, which is arranged to reduce the sampling rate of the output signal y. It is to be noted that the actual measurement result is given by an output signal after the decimation and is typically a bit string of 14 bits. The switch circuit 3 enables the charging or discharging of the capacitors C1 and C2 by Vref, Vdd and Vss voltage sources, where Vss is the ground or 0 V, Vdd is the maximum voltage applicable in the measurement circuit and Vref is a voltage value between Vss and Vdd. Both of these capacitors are discharged when the voltage across these capacitors is Vref. In the first integrator circuit 5 the differential charge integrator is composed of a first upper branch integrator capacitor Ci1$p$, a first amplifier amp1 and a first lower branch integrator capacitor Ci1$m$. The illustrated differential charge integrator is a symmetrical integrator and integrates charges by the two capacitors Ci1 using the amplifier amp1. This integrator is connected to the node M by an upper branch switch Tp and a lower branch switch Tm.

The first integrator circuit 5 is connected to the second integrator circuit 7 by further switches as shown in FIG. 1. The integrator in the second integrator circuit 7 is composed of a second upper branch integrator capacitor Ci2$p$, a second lower branch integrator capacitor Ci2$m$ and a second amplifier amp2. This integrator is also a symmetrically switched integrator and integrates the charge received from the first integrator circuit 5 by using alternatively the capacitors Ci2$p$, Ci2$m$ and the amplifier amp2. There are also shown capacitors Cs2$p$, Cs2$m$ and Cf2 that also help the integrator to perform the integration of the charges. Voltage sources Vrefh and Vref l provide the necessary voltages for the operation of the integrator. The second integrator circuit 7 is in this example directly connected to the comparator 9 and the analogue output signals from the second integrator circuit 7 are arranged to be fed to the comparator 9. The comparator 9 is arranged to compare the two analogue input signals received from the second integrator circuit 7. Based on the comparison, the comparator output signal has either a positive or negative value, or is equal to 1 or 0. The output of the comparator gives the binary output signal y of this measurement circuit. Thus, the comparator 9 can be considered to operate also as an analogue-to-digital converter. The comparator output signal is then arranged to be fed through a feedback signal line 11 to the switch circuit 3 to control the switching operation as will be explained later in more detail. The value of the signal y determines whether the charge to be integrated is positive or negative, i.e. whether the integration is done by the upper branch of the measurement structure or by the lower branch of the measurement structure. Because of the way the described circuit integrates charges, the circuit in FIG. 1 can be considered to be a second order sigma delta structure.

Figure 2:
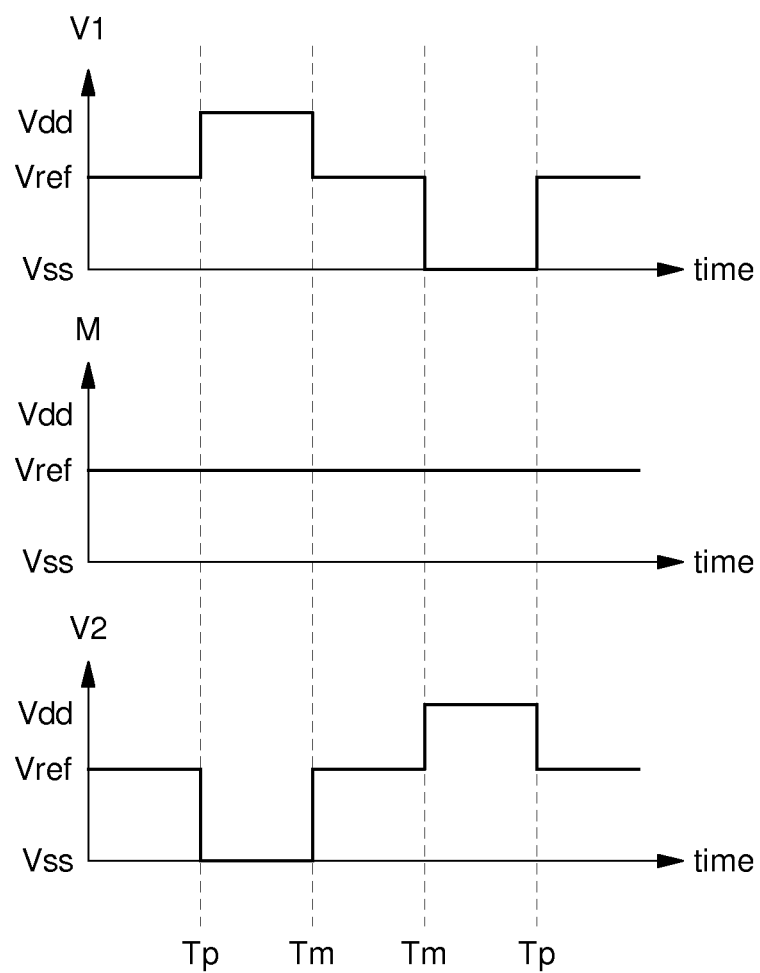
FIG. 2 is a diagram illustrating voltage switching of measurement sensor capacitors in the circuits of FIGS. 1 and 3 for digital feedback signals having two possible values.

If the value of the signal y is positive, then a positive feedback is applied to the switch circuit 3 and in this example the following sequence of two transitions is applied to the capacitors C1 and C2 as also shown in FIG. 2:

First transition: The electrical potential at V1 is switched from Vref to Vdd while the electrical potential at V2 is switched from Vref to Vss, and the switch Tp is activated or closed so that the difference of the charge stored in C1 and the charge stored in C2 is transferred into the first upper branch integrator capacitor Ci1$p$. After a given time period the switch Tp is opened.

Second transition: The electrical potential at V1 is switched from Vdd to Vref while the electrical potential at V2 is switched from Vss to Vref, and the switch Tm is activated or closed so that the difference of the charge stored in C1 and the charge stored in C2 is transferred into a first lower branch integrator capacitor Ci1$m$. After a given time period the switch Tm is opened.

If the value of the signal y is negative, then negative feedback is applied to the switch circuit 3 and in this example the following sequence of two transitions is applied as also shown in FIG. 2:

First transition: The electrical potential at V1 is switched from Vref to Vss while the electrical potential at V2 is switched from Vref to Vdd, and the switch Tm is activated or closed so that the difference of the charge stored in C1 and the charge stored in C2 is transferred into the first lower branch integrator capacitor Ci1$m$. After a given time period the switch Tm is opened.

Second transition: The electrical potential at V1 is switched from Vss to Vref while the electrical potential at V2 is switched from Vdd to Vref, and the switch Tp is activated or closed so that the difference of the charge stored in C1 and the charge stored in C2 is transferred into the a first upper branch integrator capacitor Ci1$p$. After a given time period the switch Tp is opened.

According to the present invention, the integrators are arranged to integrate charge during every voltage transition, i.e. when the voltage across the capacitors C1 and/or C2 is rising or dropping from one value to another. No integration, however, takes place when the voltage value remains constant. The operation of the switches Tp and Tm is preferably synchronized with the operation of the switch circuit 3. In the switch circuit, the voltage switch frequency may be for instance between 100 kHz and 1000 kHz. The voltage switch frequency is preferably constant during the operation of the measurement circuit. The integration of charge is done alternately in the integrators of the upper branch and in the integrators of the lower branch of the measurement circuit. In other words, when the switch Tp is closed, the switch Tm is open, and vice versa.

According to this embodiment, during the initialization phase when Vcm is connected to the second integrator circuit 7, the common node M is connected directly to Vref, and during the normal operation of the circuit the node M remains connected to the virtual ground Vref through the amplifier amp1 and remains thus substantially at constant electrical potential. This property enables the elimination of parasitic capacitance between the node M and ground. Thus, the signal corresponding to the transferred charge is subsequently not affected by the parasitic capacitance.

The operation of a second order analogue front end for capacitive sensing was described above with reference to FIG. 1. The term second order structure is understood here to refer to a structure having two integrator circuits. It is however possible to implement the measurement circuit by using structures of higher orders. Indeed, the greater the number of integrator circuits in the measurement structure, the more the quantization noise can be reduced.

Figure 3:
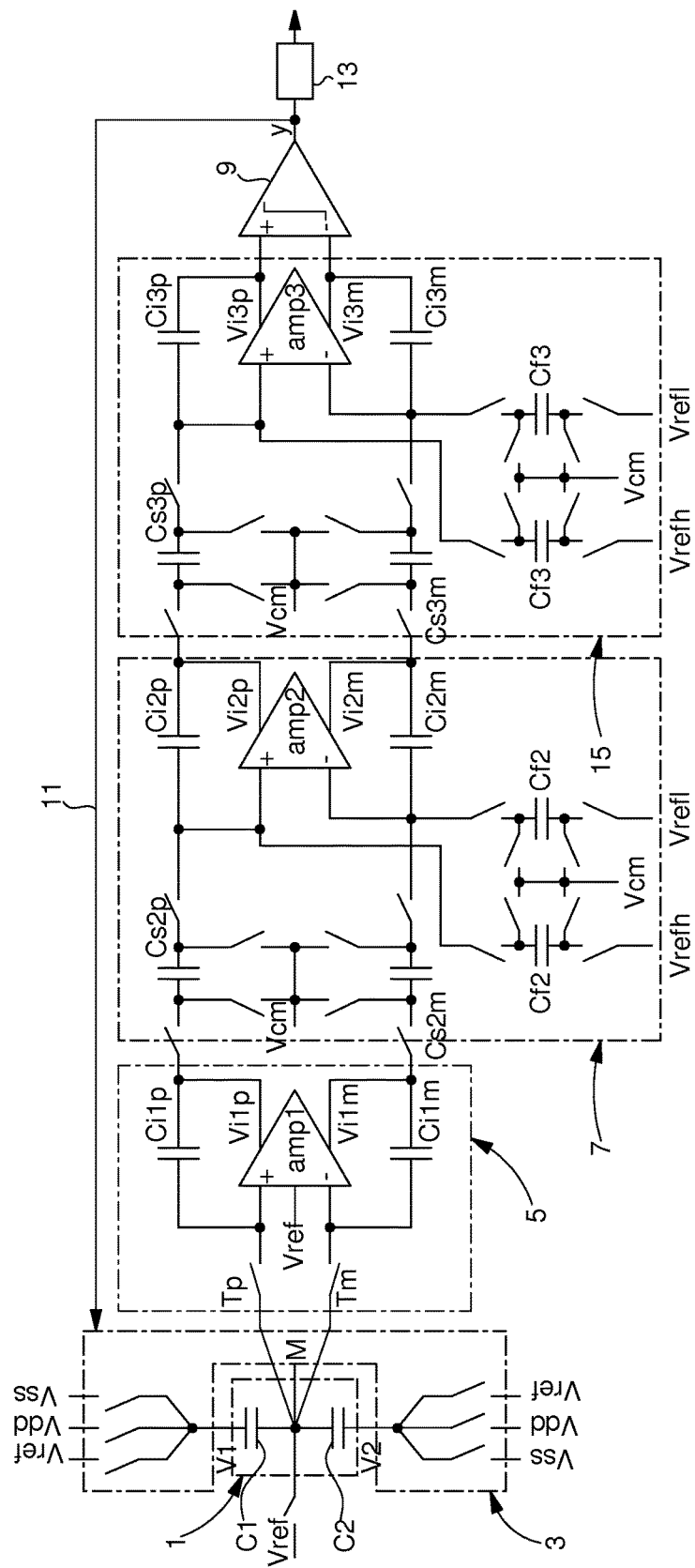
FIG. 3 is a block diagram showing a third order electronic measurement circuit according to one aspect of the present invention.

FIG. 3 is a block diagram showing another measurement circuit, in this case a third order analogue front end for capacitive sensing. As can be seen, the circuit is similar to the circuit illustrated in FIG. 1 with the exception that the circuit of FIG. 3 further comprises a third integrator circuit 15, whose structure is identical to the structure of the second integrator circuit 7. This third integrator circuit is also a symmetrically switched integrator and integrates the charge received from the second integrator circuit 7 by using alternatively the capacitors Ci3$p$, Ci3$m$ and the amplifier amp3. There are also shown capacitors Cs3$p$, Cs3$m$ and Cf3 that also help the integrator to perform the integration of the charges. The transitions explained above also apply to the circuit of FIG. 3 or to any other measurement circuit of higher order.

The voltage variations across the capacitors C1 and C2 explained above and illustrated in FIG. 2 induce a transfer of a charge Q into Ci1$p$, Ci1$m$ and from there to the other integrators' capacitors and the voltage integration at nodes Vi1$p$ and Vi1$m$ depending on the value of the output signal y. Indeed, the transfer of the charge Q is defined in the upper or positive branch (via the switch Tp) as follows:

The first transition when the value of the signal y is positive, e.g. +1: Q=dQ1+dQ2, where dQ1=C1·(Vref−Vref)−C1·(Vref−Vdd) and dQ2=C2·(Vref−Vref)−C2·(Vref−Vss), Vref=Vdd/2+Vmax, where dQ1 and dQ2 are the rate of change of the stored charge or surface charge on capacitors C1 and C2, respectively, and Vmax describes a degree of freedom to settle the sensitivity of the system (output signal after decimation/(C1−C2)). Thus, Q=−C1·(−Vdd/2+Vmax)−C2·(Vdd/2+Vmax) or Q=(C1−C2)·Vdd/2−Vmax·(C1+C2).

The second transition when the value of the signal y is negative, e.g. −1: Q=dQ1+dQ2, where dQ1=C1·(Vref−Vref)−C1·(Vss−Vref) and dQ2=C2·(Vref−Vref)−C2·(Vdd−Vref), Vref=Vdd/2+Vmax. Thus, Q=C1·(Vdd/2+Vmax)+C2·(−Vdd/2−Vmax) or Q=(C1−C2)·Vdd/2+Vmax·(C1+C2).

As a result, the following expression is obtained:

$$Vi1p(n+1)=Q/Ci1p=((C1-C2)/Ci1p)\cdot Vdd/2-Vmax\cdot((C1+C2)/Ci1p)\cdot y+Vi1p(n)$$

In the above equation, the variable n denotes a given state. The voltage at Vi1m is the symmetrical node voltage of the voltage at Vi1p, and its equation is:

$$Vi1m(n+1)=Q/CCi1m=-((C1-C2)/Ci1m)\cdot Vdd/2+Vmax\cdot((C1+C2)/Ci1m)\cdot y-Vi1m(n)$$

In the above measurement circuits, if the oversampling rate is increased, the quantization noise can be reduced and at the same time the effective number of bits after the decimation is increased. For instance, if the effective number of bits after the decimation is 14, then in the described second order structure, the oversampling rate would be 88, whereas for the described third order structure, the oversampling rate would be 24. The oversampling rate is given by fs/(2·B), where fs is the sampling frequency and B is the bandwidth. In the described structures, the output signal after decimation is the capacitance difference between C1 and C2 multiplied by a factor and delayed by a given factor. The more integrator circuits there are, the more the output signal is delayed.

Figure 4:
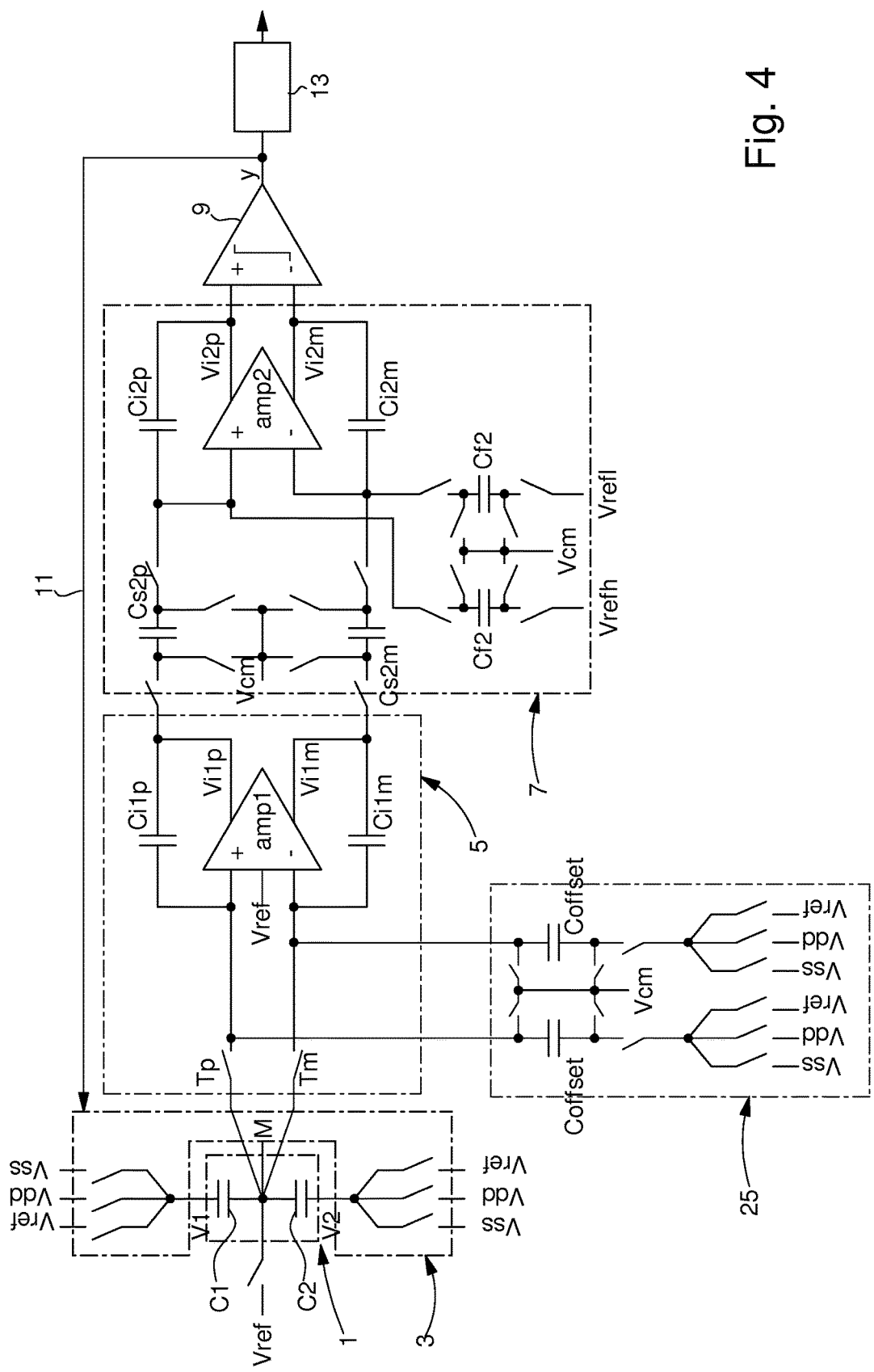
FIG. 4 is a block diagram showing the circuit of FIG. 1 and further comprising an offset/gain trimming structure.

FIG. 4 shows the second order configuration of FIG. 1, but further comprising an offset/gain trimming unit 25 connected through switches to the rest of the system, in this example to the first integrator circuit 5. The proposed trimming technique embedded in the proposed system involves the trimming of the gain and that of the offset between the capacitances of C1 and C2 thanks to the two offset capacitors Coffset. The capacitance values of the capacitors Coffset may be coded for example on 10 bits, which does not require high linearity constraints. The voltage Vref is arranged to modulate the charge injected to the first upper/lower branch integrator capacitors Ci1p, Ci1m that will create the offset and in this way, the offset is independent of the gain. The amount of charge injected to the first integrator circuit 5 depends on the switching of the six voltage switches shown in FIG. 4.

The measurement circuits described above can be modified in several other ways. For instance, the order of the measurement circuit can be increased to comprise more integrator circuits, or a multiple bit quantizer may be used. Multiple bit structure can be achieved by using a multilevel quantizer and using several transitions (e.g. more than two) for one feedback signal cycle, i.e. for one value of the feedback signal. Irrespective of the slight modifications in the structure, the mean electrostatic force applied by the two fixed electrodes to the central electrode or to the moving mass is zero. Furthermore, thanks to the symmetric structure of the measurement circuit, there is no need for a reset phase for every feedback signal cycle. Indeed, in the present invention, after two transitions, the voltage across C1 and C2 is again switched to Vref, which corresponds to the initial state.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. An electronic measurement circuit for measuring a physical parameter, the circuit comprising:
   a measurement sensor comprising two differential mounted capacitors each comprising a fixed electrode, and a common electrode, common to the two capacitors which is arranged to be movable relative to each fixed electrode of the two capacitors in order to alter the capacitive value of each capacitor when the physical parameter is measured;
   a first integrator unit connected to the common electrode for integrating charge received from the measurement sensor, and comprising two integrators arranged to be connected alternately to the common electrode via two switches;
   at least one intermediate integrator unit connected to integrate charge received from the first integrator unit, the or each intermediate integrator unit comprising two integrators arranged to integrate charge alternately from the two integrators of the first integrator unit;
   a comparator for comparing analog output values from the two integrators of the or a last one of the at least one intermediate integrator unit;
   a switch circuit connected to the measurement sensor for switching different voltage values across the two capacitors;
   a feedback circuit for feeding a digital output signal of the comparator to the switch circuit for controlling the operation of the switch circuit: and
   a capacitance offset trimming circuit comprising at least two further capacitors connected by switches to a voltage switch circuit allowing to switch different voltage values across the further capacitors.

2. The measurement circuit according to claim 1, wherein the first integrator unit and the at least one intermediate integrator unit are connected in series.

3. The measurement circuit according to claim 2, wherein the first integrator unit and the at least one intermediate integrator unit are connected by two switches arranged to operate alternately.

4. The measurement circuit according to claim 1, wherein each of the integrator units comprises one amplifier and two integrator capacitors connected as a symmetrical integrator.

5. The measurement circuit according to claim 1, wherein the capacitance offset trimming circuit is connected to the first integrator unit.

6. The measurement circuit according to claim 1, further comprising a decimation unit connected to the comparator for obtaining a sensor measurement value.

7. A method of measuring a physical parameter by an electronic measurement circuit comprising a measurement sensor comprising two differential mounted capacitors, each comprising a fixed electrode, and a common electrode, common to both of the capacitors, which is arranged to be movable relative to each fixed electrode of the two capacitors in order to alter the capacitive value of each capacitor when the physical parameter is measured, the method comprising:
   a first integrator unit connected to the common electrode integrating charge received from the measurement sensor, wherein the first integrator unit comprises two integrators connected alternately to the common electrode and performing the integration of the charge alternately via two switches;
   at least one intermediate integrator unit connected integrating charge received from the first integrator unit, the at least one intermediate integrator unit comprising two integrators performing the integration of the charge alternately from the two integrators of the first integrator unit;
   a comparator comparing analog output values from the two integrators of the or a last one of the at least one intermediate integrator unit;
   a feedback circuit feeding a digital output signal of the comparator to a switch circuit connected to the measurement sensor; and
   the switch circuit varying the voltage across the two capacitors as a function of the received digital output signal,
   wherein the voltage across the two capacitors is switched between at least three different voltage values.

8. The method according to claim 7 wherein one of the voltage values is substantially zero, one of the voltage values represents a maximum voltage, and one of the voltage values is between zero and the maximum voltage.

9. The method according to claim 7, wherein one value of the comparator output signal causes each of the two integrators of the first integrator unit to integrate alternately the difference of charge between the two capacitors.

10. The method according to claim 7 wherein one value of the comparator output signal changes the voltage across each of the two capacitors from a first voltage value to a second voltage value and back to the first voltage value.

11. The method according to claim 10, wherein, when the voltage value across one of the capacitors is switched to the second voltage value, the voltage value across the other capacitor is switched to the third voltage value.

12. The method according to claim 7, wherein the common electrode is substantially at a constant electrical potential during the operation of the measurement circuit.

13. The method according to claim 7, wherein the first integrator unit is connected to the measurement sensor by the two switches, and the operation of the two switches is synchronized with the operation of the switch circuit.

14. A method of measuring a physical parameter by an electronic measurement circuit comprising a measurement sensor comprising two differential mounted capacitors, each comprising a fixed electrode, and a common electrode, common to both of the capacitors, which is arranged to be movable relative to each fixed electrode of the two capacitors in order to alter the capacitive value of each capacitor when the physical parameter is measured, the method comprising:

- a first integrator unit connected to the common electrode integrating charge received from the measurement sensor, wherein the first integrator unit comprises two integrators connected alternately to the common electrode and performing the integration of the charge alternately via two switches;
- at least one intermediate integrator unit connected integrating charge received from the first integrator unit, the at least one intermediate integrator unit comprising two integrators performing the integration of the charge alternately from the two integrators of the first integrator unit;
- a comparator comparing analog output values from the two integrators of the or a last one of the at least one intermediate integrator unit;
- a feedback circuit feeding a digital output signal of the comparator to a switch circuit connected to the measurement sensor; and
- the switch circuit varying the voltage across the two capacitors as a function of the received digital output signal,
- wherein one value of the comparator output signal causes each of the two integrators of the first integrator unit to integrate alternately the difference of charge between the two capacitors.

* * * * *